United States Patent [19]
Barrett et al.

[11] Patent Number: 5,441,310
[45] Date of Patent: Aug. 15, 1995

[54] CEMENT HEAD QUICK CONNECTOR

[75] Inventors: Stephen P. Barrett, Lyne of Skene, Scotland; Paul A. Crawford, Stephenville, Tex.

[73] Assignee: FMC Corporation, Chicago, Ill.

[21] Appl. No.: 206,352

[22] Filed: Mar. 4, 1994

[51] Int. Cl.$^6$ .............................................. F16L 35/00
[52] U.S. Cl. ....................................... 285/18; 285/90; 285/178; 285/308; 285/314; 285/315; 285/920
[58] Field of Search ................. 285/18, 309, 310, 315, 285/316, 178, 920, 90, 308, 314

[56] References Cited

U.S. PATENT DOCUMENTS

| | | |
|---|---|---|
| 965,286 | 7/1910 | Ferguson . |
| 1,006,190 | 10/1911 | Estell et al. . |
| 1,046,328 | 12/1912 | Preuss . |
| 1,071,921 | 9/1913 | Hilton . |
| 2,047,569 | 7/1936 | Loomis . |
| 3,321,217 | 5/1967 | Ahlstone . |
| 3,325,190 | 6/1967 | Eckert et al. . |
| 3,333,870 | 8/1967 | Watkins . |
| 3,339,947 | 9/1967 | Maisey . |
| 3,379,460 | 4/1968 | Allyn . |
| 3,427,048 | 2/1969 | Brown ............................ 285/315 X |
| 3,450,421 | 6/1969 | Harwell ......................... 285/315 X |
| 3,841,665 | 10/1974 | Capot . |
| 3,874,706 | 4/1975 | Arnold . |
| 4,394,039 | 7/1983 | Burquier . |
| 4,402,533 | 9/1983 | Ortloff ............................ 285/920 X |
| 4,522,430 | 6/1985 | Stromberg . |
| 4,524,998 | 6/1985 | Brisco . |
| 4,613,161 | 9/1986 | Brisco . |
| 4,624,483 | 11/1986 | Stromberg . |
| 5,080,405 | 1/1992 | Sasa et al. ...................... 285/315 |
| 5,152,554 | 10/1992 | La Fleur et al. ............... 285/315 X |

FOREIGN PATENT DOCUMENTS 0093561  4/1983  European Pat. Off. .

OTHER PUBLICATIONS

"Baker Oil Tools Kwik Koupler, Over-The-Collar Casing Circulating Head".

*Primary Examiner*—Dave W. Arola
*Attorney, Agent, or Firm*—Lawrence Cruz

[57] ABSTRACT

A coupling for quickly connecting a cement head to a casing of an oil or gas well comprises tube-shaped upper and lower bodies that connected to each other and are telescopically adjustable. The upper body receives the cement head and the lower body attaches to the casing. A clamp mechanism utilizing split ring segments is located in the lower body and is actuated by a piston for quickly attaching or releasing the lower body to and from the casing.

4 Claims, 5 Drawing Sheets

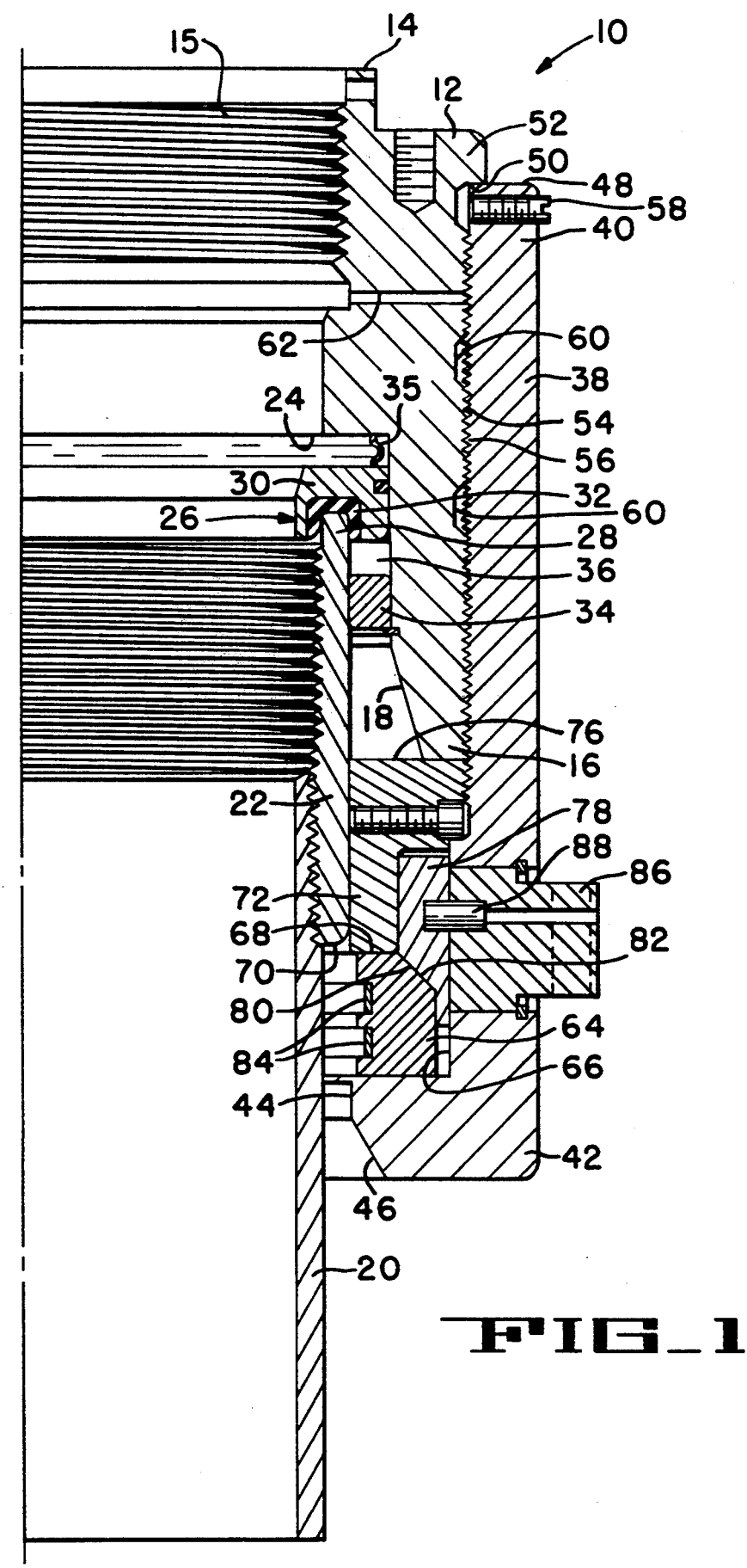
FIG_1

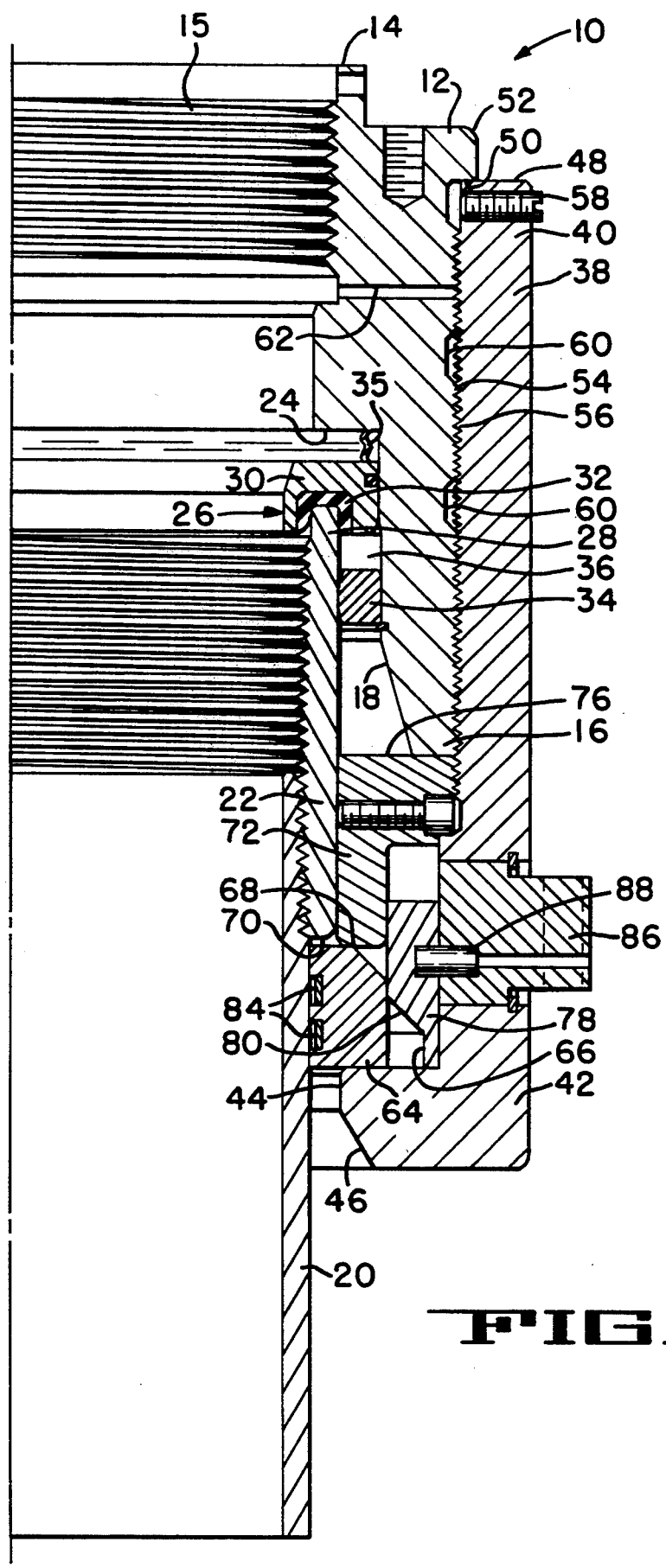
FIG_2

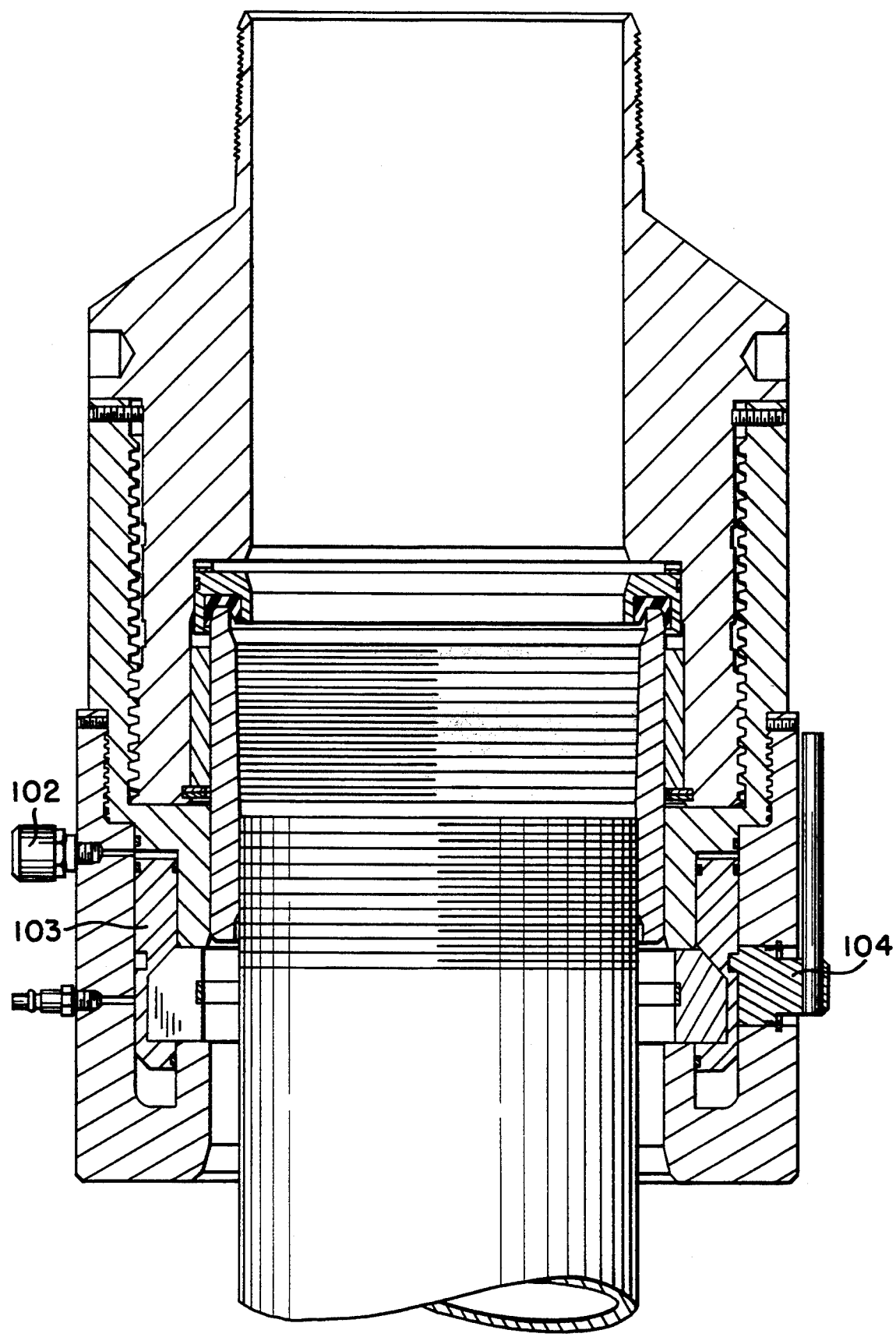
FIG_3

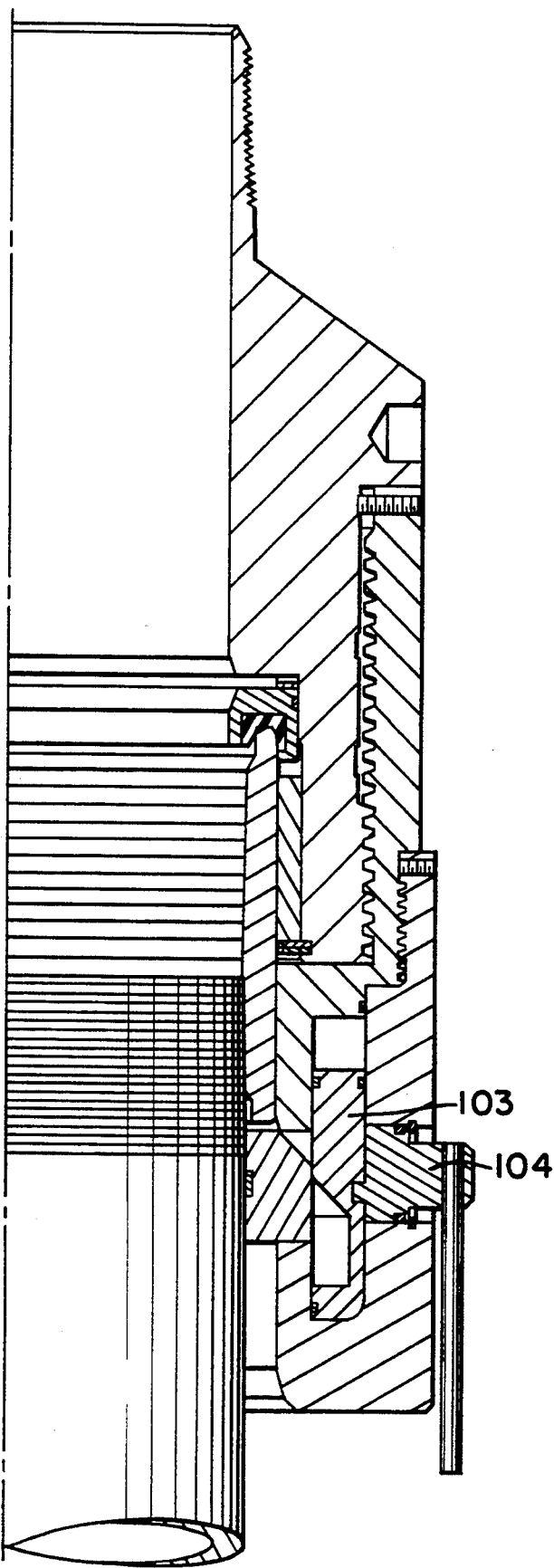
FIG_4

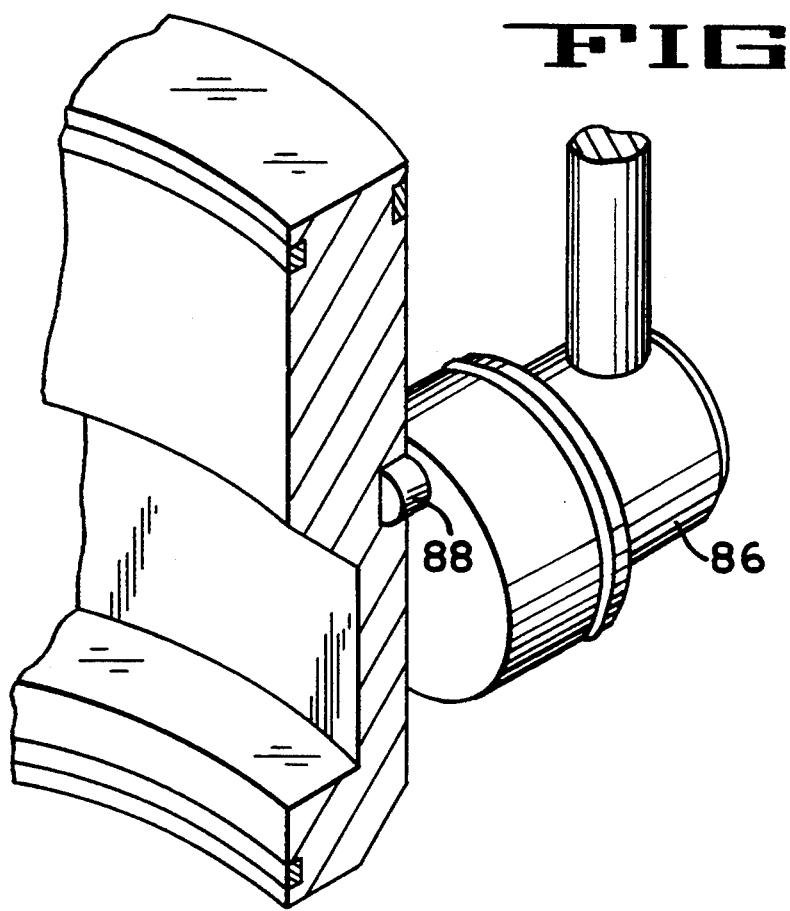
FIG_5
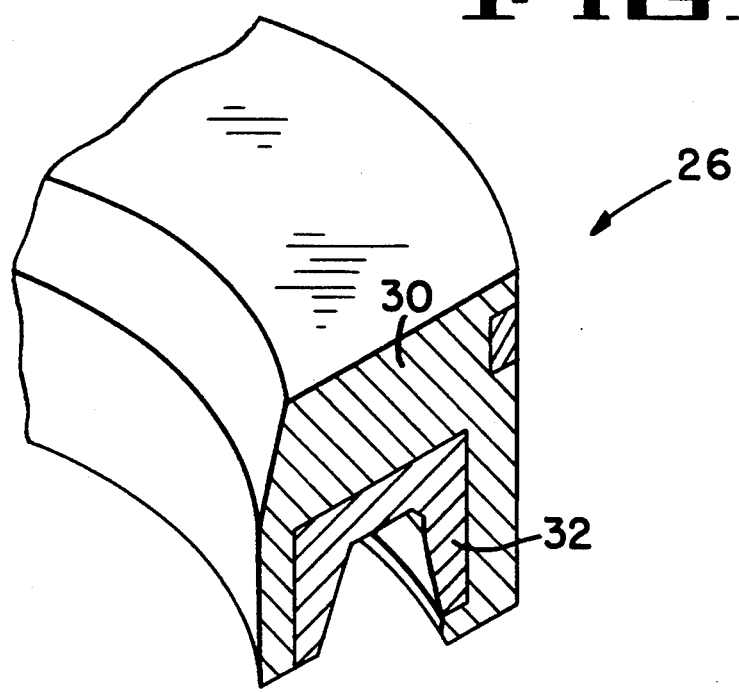
FIG_6

CEMENT HEAD QUICK CONNECTOR

BACKGROUND OF THE INVENTION

The present invention relates to a coupling adapted to be quickly connected to a cylindrical member and, more particularly, to a coupling for quickly connecting a cement head to a casing of an oil or gas well.

During the completion of an oil or gas well, a cementing operation is carried out in which cement slurry is pumped through the control bore of the well casing and at through ports in the side of the well casing into the annulus formed between the well casing and the bore hole. When the cement hardens it forms a seal between the well casing and the bore hole to protect oil producing zones and non-oil producing zones from contamination. In addition, the cement bonds the casing to the surrounding bore hole providing support and strength to the casing, preventing blowouts, and protecting the casing from corrosion. In one of several typical cementing operations, the well bore and well casing are filled with drilling mud prior to cementing. A cementing plug is pumped ahead of the cement slurry in order to prevent mixing of the drilling mud already in the casing with the cement slurry. When the cementing plug reaches a collar or shoulder stop in the casing, the cement slurry pressure above the plug increases until the plug ruptures enabling the cement slurry to pass through the plug and then through the side ports and into the annulus between the casing and the well bore. Subsequently, another cementing plug is pumped down the casing to prevent mixing of the cement slurry with additional drilling mud which is pumped into the casing following the cement slurry. When the top cementing plug lands on the collar or stop shoulder, the pumping of cement slurry ceases.

In order to perform various cementing operations such as the above cementing operation, it is usually necessary to employ a cement head on top of the well casing. The cementing plugs are held within the cement head until the cementing operation requires their deployment. Known cement heads typically utilize a threaded end for connection to an internally threaded casing. This requires hazardous and often difficult threading operations requiring chain tongs. In addition, the threads can sometimes become damaged during such operations and thereby pose a blowout risk. It is therefore desirable to provide a device for quickly and safely coupling a plug container to a wellhead casing.

SUMMARY OF THE INVENTION

The present invention coupling apparatus includes a generally tube-shaped upper body having an upper end adapted to receive a cement head or plug container and a lower end adapted to fit around a wellhead casing end in sealing engagement. The coupling apparatus further includes a generally tube-shaped lower body adapted to fit around the upper body in telescoping fashion and having a lower end adapted to fit around the wellhead casing end. The upper and lower bodies form an annular space therebetween in which a plurality of split ring segments are housed. The split ring segments are each provided with a beveled outer surface which cooperates with a corresponding beveled surface on a piston to cause movement of each segment in response to movement of the piston such that the ring segments engage or disengage the casing. In one embodiment, the piston can be actuated mechanically by a piston cam received in the lower housing. In another embodiment, the piston can be actuated mechanically or hydraulically. Means are provided to adjust the relative axial position at the upper and lower bodies with respect to each other in order to adjust the overall axial length of the coupling apparatus to fit a variety of casing ends.

BRIEF DESCRIPTION OF THE DRAWINGS

FIG. 1 is a partial, sectioned view of the one embodiment of the coupling apparatus of the present invention positioned over a well casing end in an unlocked position.

FIG. 2 illustrates the coupling apparatus of FIG. 1 in a locked position.

FIG. 3 is a partial, sectional view of another embodiment of the present invention position over a well casing end in an unlocked position.

FIG. 4 illustrates the coupling apparatus of FIG. 3 in a locked position,

FIG. 5 is a detail of the rotary cam positioned in the piston.

FIG. 6 is a detail of the seal means 26.

DESCRIPTION OF THE PREFERRED EMBODIMENTS

A first embodiment of the coupling apparatus 10 of the present invention is shown in FIG. 1. The coupling apparatus 10 includes a generally tube-shaped upper body 12 having an upper end 14 and a lower end 16. The upper end 14 is adapted to receive a cement head or plug container by internal threads 15 or external threads (not shown) or other conventional means. The lower end 16 is preferably provided with an inner beveled surface 18 such that the lower end 16 can be easily stabbed over a variety of sizes of casing ends. In FIG. 1, the upper body 12 is shown positioned over a casing 20 provided with an internally threaded casing collar 22 over the end of the casing 20. The upper body 12 has a downwardly-facing shoulder 24 adapted to engage seal means 26 for sealing between the upper body 12 and an upwardly facing surface of the casing end 28. Seal means 26 can be a metal or other suitable ring 30 having a U-shaped profile receiving a similarly profiled ring 32 of molded rubber or other suitable material. A spacer ring 34 can be positioned in the annular space 36 between the inner diameter of the upper body 12 and the outer diameter of the casing collar 22. A ring-shaped wave spring 35 or other suitable spring means can be provided to enhance seal energization.

A generally tube-shaped lower body 38 having an upper end 40 and a lower end 42 is provided, telescopically receiving the upper body 12 therein. The lower end 42 has an opening 44 including a beveled edge 46 such that the lower end 42 can be easily stabbed over a variety of sizes of casing ends. The upper end 40 is provided with an end-surface 48 adapted to abut the lower surface 50 of a radially extending flange 52 of the upper body 12 when the upper body 12 and the lower body 38 are relatively adjusted to a short length as shown in FIG. 1. The length can be adjusted to accommodate a variety of casing and collar sizes. The upper body 12 has external threads 54 and the lower body 38 has internal threads 56 to provide for such relative adjustment. A set screw 58 or other suitable means is provided to pass through the upper end 40 of the lower body 38 and engage one of several indents 60 on the outer diameter of the upper body 12 to lock the upper body 12 and lower body 38 in positions relative to each other. A radial channel 62 extends between the inner diameter of the upper body and the inner diameter of the lower body 38 to enable detection of drilling mud or cement leaks and to prevent such leaks from flowing between threads 15 and causing lock-up.

A plurality of split ring segments 64 are provided in an annular space 66 between the lower body 38 and the casing 20 at a position below the lower end 16 of the upper body 12. The ring segments 64 are adapted to move between an open position as shown in FIG. 1 and a closed position as shown in FIG. 2 whereby the casing is clamped tightly by the segments 64. An upper surface 68 of each ring segment 64 is adapted to abut the lower radial edge 70 of the casing collar 22, locking the coupling apparatus 10 securely to the casing 20. A spacing collar 72 abuts the upper surface 68 of each segment 64 when the segments 64 are in an open position. The upper radial surface 76 of the collar 72 abuts the lower end 16 of the upper body 12.

A generally ring-shaped piston 78 having a beveled inner surface 80 at its lower end is provided to cause the ring segments to move from an open position to a closed position. The ring segments 64 are each provided with an outer beveled surface 82 corresponding to the surface 80 to transmit the motion of the piston 78 to the ring segments 64. Internal spring means 84 are provided to bias the ring segments 64 radially back to the open position when the piston 78 is withdrawn. As shown in FIG. 1, there is provided a piston cam 86 mounted for rotary motion in the lower body 38 having a pin 88 adapted to ride in a slot (not shown) in order to transmit rotary motion of the cam to the piston 78. In the embodiment of FIGS. 3 and 4, there is provided hydraulic means 102 for delivering fluid under pressure to actuate the piston 103. Mechanical actuator means 104 similar to those of FIGS. 1 and 2 are provided for alternatively actuating the piston 103.

While the preferred embodiments of the present invention have been disclosed and described, it is understood that various modifications can be made without departing from what is regarded as the scope and the subject matter of the invention.

We claim:

1. A coupling for connection to a cylindrical member having a longitudinal axis comprising
    an upper body having a generally tubular shape, a first section adapted to be placed over a first end of said cylindrical member, and a second section opposite said first section adapted to receive a member to be coupled with said cylindrical member;
    a lower body having a generally tubular shape, a first section adapted to telescopically receive said first section of said upper body, and a second section adapted to be placed over said first end of said cylindrical member;
    external threads (54) provided along the outer circumferential surface of said upper body, said external threads corresponding to and adapted to engage internal threads (56) provided along the inner circumferential surface of said lower body, whereby engagement of said external threads and said internal threads structurally join said upper body and said lower body;
    connecting means received in said second section of said lower body and adapted to engage said cylindrical member;
    actuator means for selectively causing said connecting means to engage and disengage said cylindrical member;
    means for selectively locking said connection means in a position wherein said connecting means is in engagement with said cylindrical member;
    first seal means for sealing between said upper body and said first end of said cylindrical member;
    means for adjusting the relative position of said upper body to said lower body when said upper body is received in said lower body;
    said actuator means comprise mechanical means for selectively causing said connecting means to engage and disengage said cylindrical member;
    said connecting means comprise a plurality of ring segments which, when assembled, form a ring having an inner diameter approximately equal to the outer diameter of said cylindrical member.

2. A coupling according to claim 1, wherein
    said actuator means comprise mechanical means and hydraulic means, each being independently operable such that either of said mechanical means or said hydraulic means may be activated for selectively causing said connecting means to engage and disengage said cylindrical member.

3. A coupling according to claim 2, wherein
    said actuator means further comprise a generally ring-shaped piston adapted to move axially and cause said connecting means to engage or disengage said cylindrical member in response to said axial movement.

4. A coupling according to claim 1, wherein
    said actuator means further comprise a generally ring-shaped piston adapted to move axially and cause said connecting means to engage or disengage said cylindrical member in response to said axial movement.

* * * * *